(12) United States Patent
Zhang

(10) Patent No.: US 11,139,995 B2
(45) Date of Patent: Oct. 5, 2021

(54) METHODS AND ROUTER DEVICES FOR VERIFYING A MULTICAST DATAPATH

(71) Applicant: Alcatel Lucent, Nozay (FR)

(72) Inventor: Lixin Zhang, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 16/311,000

(22) PCT Filed: Jun. 15, 2017

(86) PCT No.: PCT/IB2017/000936
§ 371 (c)(1),
(2) Date: Dec. 18, 2018

(87) PCT Pub. No.: WO2018/002713
PCT Pub. Date: Jan. 4, 2018

(65) Prior Publication Data
US 2020/0220742 A1    Jul. 9, 2020

(30) Foreign Application Priority Data
Jun. 30, 2016   (CN) .................. 201610510442.X

(51) Int. Cl.
*H04L 12/18* (2006.01)
*H04L 12/26* (2006.01)

(52) U.S. Cl.
CPC ...... *H04L 12/1868* (2013.01); *H04L 43/0811* (2013.01); *H04L 43/106* (2013.01)

(58) Field of Classification Search
CPC ....... H04L 12/26; H04L 12/18; H04L 43/106; H04L 12/1863; H04L 12/1868; H04L 43/0811
See application file for complete search history.

(56) References Cited

U.S. PATENT DOCUMENTS 7,940,685 B1 *   5/2011   Breslau .............. H04L 43/0835
                                                       370/251
2005/0232227 A1 *  10/2005   Jorgenson ............. H04L 43/10
                                                       370/351

(Continued)

FOREIGN PATENT DOCUMENTS

CN         101056227 A      10/2007
CN         103428045 A      12/2013
(Continued)

OTHER PUBLICATIONS

Request for Comments 4379; "Detecting Multi-Protocol Label Switched (MPLS) Data Plane Failures"; Kompella et al.; Feb. 2006 (Year: 2006).*

(Continued)

*Primary Examiner* — Benjamin H Elliott, IV
(74) *Attorney, Agent, or Firm* — Harness, Dickey & Pierce, P.L.C.

(57) ABSTRACT

The method includes at an initiating router generating a multicast echo request message that at least includes an identifier of a multicast tree and an indication of at least one responding router that should respond to the multicast echo request message; and sending the multicast echo request message to a downstream router of the initiating router along the multicast datapath of the multicast tree.

15 Claims, 8 Drawing Sheets

(56) References Cited

U.S. PATENT DOCUMENTS

| | | | | |
|---|---|---|---|---|
| 2007/0091827 | A1* | 4/2007 | Boers | H04L 45/50 370/255 |
| 2008/0080507 | A1* | 4/2008 | Swallow | H04L 43/50 370/392 |
| 2008/0101241 | A1* | 5/2008 | Mohan | H04L 12/4641 370/236.2 |
| 2011/0292857 | A1* | 12/2011 | Sarikaya | H04L 29/12358 370/312 |
| 2011/0317696 | A1* | 12/2011 | Aldrin | H04L 12/1881 370/390 |
| 2012/0033667 | A1* | 2/2012 | Venkataraman | H04L 45/16 370/390 |
| 2015/0063094 | A1* | 3/2015 | Li | H04L 12/1863 370/218 |
| 2015/0263847 | A1* | 9/2015 | Baillargeon | H04L 7/0008 370/216 |
| 2016/0112481 | A1* | 4/2016 | Pani | H04L 12/4633 370/390 |
| 2018/0212849 | A1* | 7/2018 | Hobgood | H04L 43/0852 |
| 2020/0220742 | A1* | 7/2020 | Zhang | H04L 12/1868 |

FOREIGN PATENT DOCUMENTS

| | | |
|---|---|---|
| CN | 103840980 A | 6/2014 |
| WO | WO-2016/061931 A1 | 4/2016 |

OTHER PUBLICATIONS

Request for Comments 6450; "Multicast Ping Protocol"; Venaas; Dec. 2011 (Year: 2011).*

Kamil Sarac et al: "Tracetree", IEEE / ACM Transactions on Networking, IEEE / ACM, New York, NY, US, vol. 12, No. 5, Oct. 2004 (Oct. 1, 2004), pp. 795-808, XP058303368, ISSN: 1063-6692. DOI: 10.1109/TNET.2004.836123 p. 795, paragraph 1. Introduction—p. 800, paragraph V. Improving Tracetree Scalability.

Farrel (Editor) Old Dog Consulting S Yasukawa NTT A: "Detecting Data Plane Failures in Point-to-Multipoint Multiprotocol Label Switching (MPLS)—Extensions to LSP Ping; draft-ietf-mpls-p2mp-lsp-ping- 08.txt", Detecting Data Plane Failures in Point-To-Multipoint Multiprotocol Label Switching (MPLS)—Extensions to LSP Ping; draft-ietf-mpls-p2mp-lsp-ping-08.txt, Internet Engineering Task Force, IETF; Standardworkingdraft, Internet Society (ISOC) 4, Rue Des, vol. mpls, No. 8, Aug. 2009 (Aug. 11, 2009), XP015063831, [retrieved on Aug. 12, 2009] p. 8, paragraph 3. Operation of LSP Ping for a P2MP LSP—p. 20, paragraph 3.3.7 Use of Downstream Detailed Mapping TLV.

Kamil Sarac et. al: Tracetree: A Utility to discover multicast Tree Topology;draft-sarac-tracetree-00, txt, Tracetree: a Utility to Discover Multicast Tree Topology; dradt-sarac-tracetree-00-txt, Internet Engineering Task Force, IETF; Standardworkingdraft, Internet Society (ISOC) 4, Rue Des Falaises CH—1205 Geneva, Switerland, Dec. 1, 2001 (Dec. 1, 2001) XP015034922, the Whole Document.

International Search Report for International Application No. PCT/IB2017/000936 published Oct. 20, 2017 1205 Geneva, Switerland, dated Dec. 1, 2001 (dated Dec. 1, 2001) XP015034922, the Whole Document.

International Search Report for International Application No. PCT/IB2017/000936 published Oct. 20, 2017.

Office Communication for corresponding European Application No. 17 757 865.5 dated Dec. 19, 2019.

Chinese Office Action dated Jan. 6, 2020 for corresponding Chinese Application No. 201610510442.X.

Chinese Office Action dated Aug. 17, 2020 for corresponding Chinese Application No. 201610510442.X.

Communication Pursuant to Article 94(3) dated Nov. 12, 2020 in European Application No. 17 757 865.5.

Yin Xiaochuan, "Network programming and development technology," CMP implementation of the original socket, Xi'an Jiaotonq University Press, published Dec. 31, 2003.

Chinese Office Action dated Dec. 31, 2020 for corresponding Chinese Application No. 201610510442.X.

* cited by examiner

| Version Number | Message Type | Time To Live | Reply Mode | Error Code |

| Initiator's Handle |
| Sequence Number |
| Time Stamp Sent |
| Time Stamp Received |
| MDT Identifier TLV (mandatory) | ←602 |
| Responder TLV (mandatory) | ←604 |
| Role TLV (Value = 0) (optional) | ←606 |

FIG. 6A

| Version Number | Message Type | Time To Live | Reply Mode | Error Code |

| Initiator's Handle |
| Sequence Number |
| Time Stamp Sent |
| Time Stamp Received |
| MDT Identifier TLV (mandatory) | ←602 |
| Role TLV (Value = 1, 2, or 3) (optional) | ←606 |

FIG. 6B

| Version Number | Message Type | Time To Live | Reply Mode | Error Code |
|---|---|---|---|---|
| Initiator's Handle ||||||
| Sequence Number ||||||
| Time Stamp Sent ||||||
| Time Stamp Received ||||||
| MDT Identifier TLV (mandatory) ||||| ← 702 |
| Responder TLV (mandatory) ||||| ← 704 |
| Role TLV (Value = 0) (optional) ||||| ← 706 |
| Trace Route TLV (mandatory for Mcast-Traceroute Request) ||||| ← 708 |

FIG. 7A

| Version Number | Message Type | Time To Live | Reply Mode | Error Code |
|---|---|---|---|---|
| Initiator's Handle ||||||
| Sequence Number ||||||
| Time Stamp Sent ||||||
| Time Stamp Received ||||||
| MDT Identifier TLV (mandatory) ||||| ← 702 |
| Role TLV (Value = 1, 2, or 3) (optional) ||||| ← 706 |
| Trace Route TLV (mandatory for Mcast-Traceroute Reply) ||||| ← 708 |

FIG. 7B

```
CLI> mcast-ping *, 224.1.1.1 responder all-leaves

Multicast Datapath Connectivity Verification
================================================================
MDT: (*, 224.1.1.1)
Initiator: 10.1.1.1 (RP)
Responders: all leaf routers
Nbr of Multicast Ping Request packets sent: 3

Summary of reply packets received:

IP Addr    Role            Nbr of Replies    Avg Single Trip Time (ms)
---------- --------------- ----------------- ---------------------------
10.1.1.4   Leaf only       3                 54
10.1.1.3   Leaf & Branch   3                 57
10.1.3.1   Leaf only       3                 114
10.1.4.1   Leaf only       3                 121
================================================================

No error reported with regard to RPF and TIB state verification.

Multicast Datapath Connectivity Verification completed.
```

FIG. 8A

```
CLI> mcast-ping *, 224.1.1.1 responder 10.1.4.1

Multicast Datapath Traceroute
================================================================
MDT: (*, 224.1.1.1)
Initiator: 10.1.1.1 (RP)
Responder: 10.1.4.1
Nbr of Multicast Ping Request packets sent: 1

Summary of reply packets received:

Hop   IP Addr    Role            Single Trip Time (ms)
----- ---------- --------------- ---------------------------
1     10.1.1.3   Leaf & Branch   59
2     10.1.4.1   Leaf only       125
================================================================

No error reported with regard to RPF and TIB state verification.

Multicast Datapath Traceroute completed.
```

FIG. 8B

METHODS AND ROUTER DEVICES FOR VERIFYING A MULTICAST DATAPATH

CROSS-REFERENCE TO RELATED APPLICATIONS

This application is a national phase under 35 U.S.C. § 371 of PCT International Application No. PCT/IB2017/000936 which has an International filing date of Jun. 15, 2017, which claims priority to Chinese Application No. 201610510442.X, filed Jun. 30, 2016, the entire contents of each of which are hereby incorporated by reference.

FIELD

Embodiments of the present disclosure generally relate to the field of wired communication, and more specifically, to methods and router devices for verifying a multicast datapath.

BACKGROUND

Currently, Request For Comments (RFC) 6450 is the standard mechanism for multicast connectivity verification. RFC 6450 requires a pair of hosts as multicast source and receiver to verify the multicast connectivity across an Internet Protocol (IP) network. It has an advantage that the multicast routers do not need to support any extra Operation, Administration and Maintenance (OAM) mechanisms to run the OAM tool as specified in RFC 6450. However, the disadvantage is that RFC 6450 is not able to trace the hop-by-hop route for a multicast datapath, which is necessary of an OAM tool.

There are also vendor-proprietary tools for IP multicast troubleshooting. For example, there are vendor-proprietary tools to show the incoming and outgoing interfaces of a multicast router to forward a particular Any Source Multicast (ASM) host group or a Source-Specific Multicast (SSM) channel, or to find out the system address of the root node of an Multicast Distribution Tree (MDT) by checking the Reverse Path Forwarding (RPF) paths reversely along the MDT. However, in strict sense, these are not true datapath OAM tools because there are no OAM packets traversing along the datapath as normal IP multicast packets.

SUMMARY

This disclosure proposes a scheme to verify a multicast datapath established on a network of IP multicast routers.

According to a first aspect of the present disclosure, there is provided a method for verifying a multicast datapath. The method comprises, at an initiating router: generating a multicast echo request message that at least comprises an identifier of a multicast tree and an indication of at least one responding router that should respond to the multicast echo request message; and sending the multicast echo request message to a downstream router of the initiating router along the multicast datapath of the multicast tree.

According to a second aspect of the present disclosure, there is provided a method for verifying a multicast datapath. The method comprises, at a router: receiving a multicast echo request message from an upstream router along the datapath of a multicast tree, the multicast echo request message comprising an identifier of the multicast tree and an indication of at least one responding router that should respond to the multicast echo request message; determining whether the router belongs to the at least one responding router indicated in the multicast echo request message based on the indication of the at least one responding router; generating a multicast echo reply message comprising the identifier of the multicast tree, in response to determining that the router belongs to the at least one responding router indicated in the multicast echo request message; and sending the multicast echo reply message to an initiating router of the multicast echo request message.

According to a third aspect of the present disclosure, there is provided a router device for verifying a multicast datapath. The router device comprises: a processor and a memory comprising instructions executable by the processor, the processor being configured to make the router device perform the method of the above first aspect.

According to a fourth of the present disclosure, there is provided a router device for verifying a multicast datapath. The router device comprises: a processor and a memory comprising instructions executable by the processor, the processor being configured to make the router device perform the method of the above second aspect.

BRIEF DESCRIPTION OF THE DRAWINGS

This disclosure will be better understood and other features, objectives and advantages of the present disclosure will become more apparent from following detailed description of the embodiments of the disclosure in conjunction with the accompanying drawings, wherein:

FIGS. 6A and 6B illustrate respectively an exemplary schematic view of a multicast echo request message and a multicast echo reply message used for multicast Ping;

FIGS. 7A and 7B illustrate respectively an exemplary schematic view of a multicast echo request message and a multicast echo reply message used for multicast route tracing;

FIG. 8A illustrates a schematic view of a CLI command interface used for multicast Ping according to an embodiment of this disclosure;

FIG. 8B illustrates a schematic view of a CLI command interface used for multicast route tracing according to an embodiment of this disclosure;

DETAILED DESCRIPTION

Preferred embodiments of this disclosure will be described below in conjunction with accompanying drawings. Although preferred embodiments are shown in accompanying drawings, it should be understood that this disclosure may be implemented in various forms but not be limited by the embodiments described herein. On the contrary, these embodiments are provided to make the disclosure more thorough and complete and to make the scope of this disclosure delivered to those skilled in this art completely.

Figure 1:
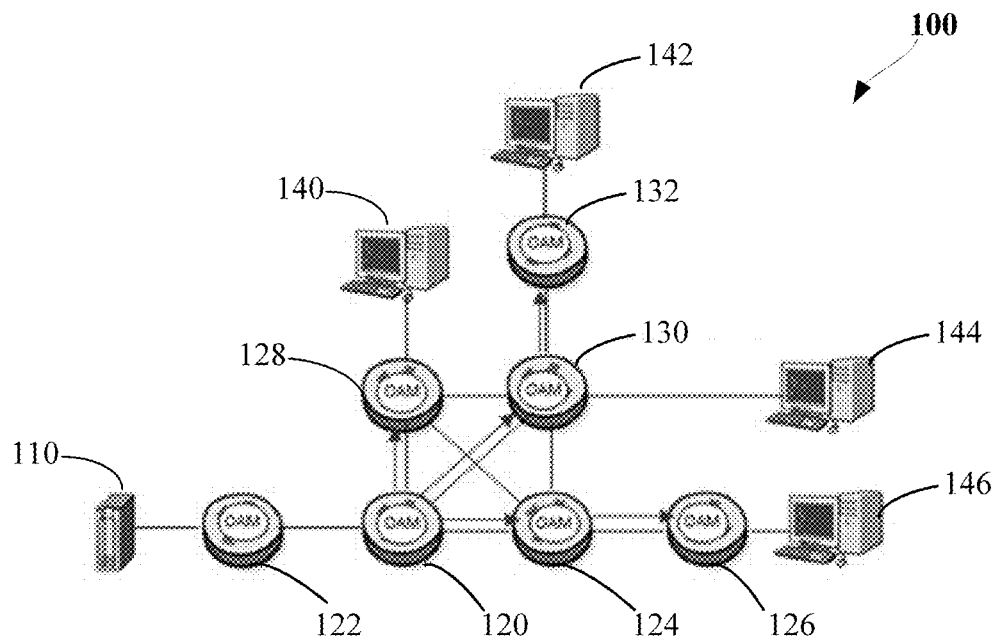
FIG. 1 illustrates a topological diagram of an exemplary multicast network.

FIG. 1 illustrates a topological diagram of an exemplary multicast tree 100. As shown in FIG. 1, the multicast tree 100 includes a multicast source 110, OAM function-supported multicast routers 120, 122, 124, 126, 128, 130 and 132, and receivers 140, 142, 144 and 146. In FIG. 1, arrowed solid lines between individual routers are used to indicate forwarding directions of multicast echo request messages constructed according to this disclosure (as described in details below) going through individual router nodes. The multicast tree 100 may be an MDT 100. In the following description, the multicast tree 100 will be described with the MDT as an example. However, it should be understood by those skilled in this art that the solution proposed in this disclosure may be equally applied to other kinds of multicast trees or multicast networks.

Although the multicast source and multicast receivers are shown in FIG. 1, methods and tools for verifying a multicast datapath proposed in this disclosure are only with respect to the multicast routers in the multicast tree 100 rather than to hosts (the multicast source and receivers). Therefore, in this description, the router network formed by the multicast routers 120, 122, 124, 126, 128, 130 and 132 is also called the MDT 100.

In one implementation, the multicast tree 100 may be a shared tree, which is also called a Rendezvous Point (RP) tree, in the ASM model, or a source tree, which is also called a source-specific tree, in an SSM model.

Figure 2:
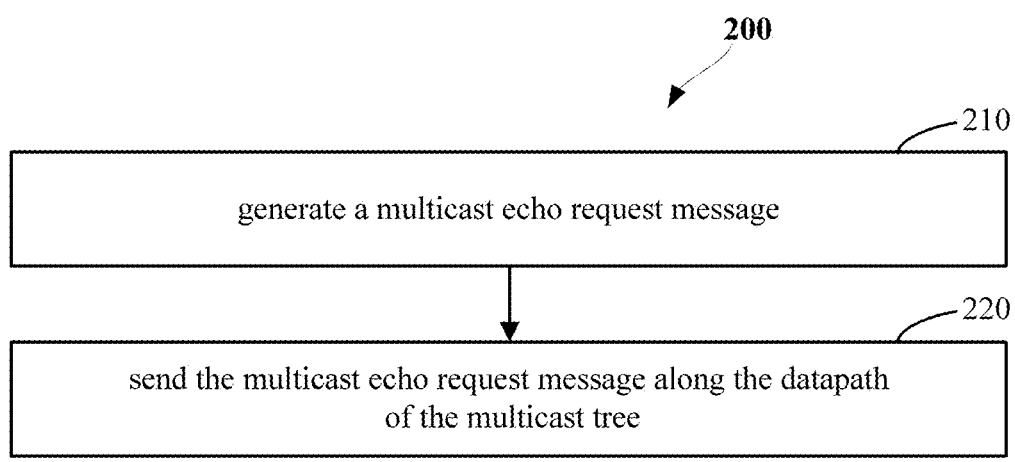
FIG. 2 illustrates a flow chart of a method for verifying a multicast datapath according to some embodiments of this disclosure.

FIG. 2 illustrates a flow chart of a method 200 for verifying a multicast datapath according to some embodiments of this disclosure. The method 200 may be performed by an initiating router (e.g., the router 120 in FIG. 1). The initiating router refers to a router that initiates a multicast datapath verification in the multicast tree 100.

In step 210, the initiating router generates a multicast echo request message which at least comprises an identifier of the multicast tree 100 and an indication of at least one responding router which should respond to the multicast echo request message.

In some implementations, the identifier of the multicast tree 100 comprises a pair of a source address and a destination address. The destination address may comprise a multicast address of the multicast tree 100. The source address, for example, may comprise a unicast address of the multicast source in the SSM model or a system address of any source in the ASM model.

In some implementations, the indication of at least one responding router which should respond to the multicast echo request message comprises an indication of at least one of the following: all routers that are leave-only nodes of the multicast tree 100, routers of all nodes of the multicast tree 100 or routers of specified nodes. A more detailed example of the multicast echo request message will be described below with reference to FIG. 4.

In some implementations, the multicast echo request message generated in the step 210 further comprises trace route indication information. The trace route indication information indicates that the multicast echo request message is used for multicast route tracing; otherwise, if the trace route indication information is not included in the multicast echo request message, it indicates that the multicast echo request message is used for multicast Ping.

In one implementation, the trace route indication information comprises a system address of the initiating router (e.g., the router 120 in FIG. 1) and a time stamp of sending the multicast echo request message. A more detailed example of the trace route indication information is the trace route TLV described below with reference to FIG. 4.

In some implementations, the multicast echo request message generated in the step 210 further comprises a message type field set to a first value. The first value is used to indicate to nodes or routers receiving the multicast echo request message that the message is a multicast echo request message for multicast datapath verification.

Then, the initiating router (e.g., the router 120 in FIG. 1) also receives a multicast echo reply message from the responding router (e.g., the router 124 in FIG. 1) that receives and responds to the multicast echo request message. The multicast echo reply message comprises a message type field set to a second value different from the first value. The second value is used to indicate to nodes or routers receiving the multicast echo reply message that the message is a multicast echo reply message for multicast datapath verification. The multicast echo reply message will be described below in more detail with reference to FIG. 3.

Figure 3:
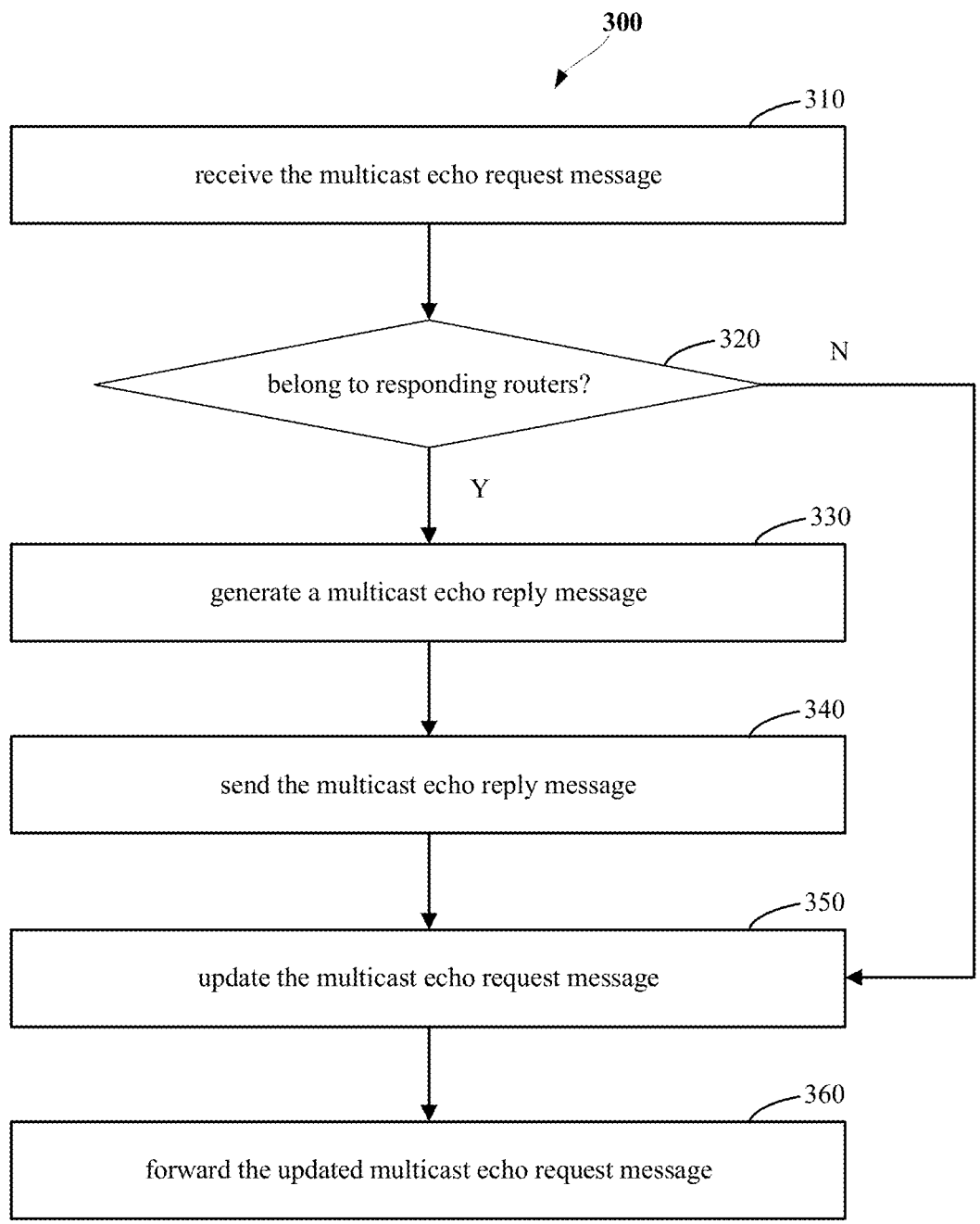
FIG. 3 illustrates a flow chart of a method for verifying a multicast datapath according to some embodiments of this disclosure.

FIG. 3 illustrates a flow chart of a method 300 for verifying a multicast datapath according to some embodiments of this disclosure. The method 300 may be performed by any router (e.g., the routers 124, 126 in FIG. 1) in the downstream of the initiating router. The router may be or may not be a responding router that responds to the multicast echo request message. The responding router refers to a router that is used to respond to the multicast echo request message initiated by the initiating router.

In step 310, the downstream router (e.g., the router 124 in FIG. 1) receives the multicast echo request message from an upstream router (e.g., the router 120 in FIG. 1) along the datapath of the multicast tree 100. The multicast echo request message includes an identifier of the multicast tree 100 and an indication of at least one responding router which should respond to the multicast echo request message.

In step 320, the downstream router 124 determines whether the downstream router 124 belongs to the indicated at least one responding router based on the indication of the at least one responding router in the multicast echo request message. For example, in one implementation, if the indication of at least one responding router in the received multicast echo request message includes all routers that are leave-only nodes of the multicast tree 100 and the downstream router 124 is a leaf-only node of the multicast tree 100, it is determined that the downstream router 124 belongs to the at least one responding router.

Alternatively, in another implementation, if the indication of at least one responding router in the received multicast echo request message includes all routers of the multicast tree 100, it is determined that the downstream router 124 belongs to the at least one responding router. In still another implementation, if the indication of at least one responding router in the received multicast echo request message includes routers of specified nodes of the multicast tree 100 and the downstream router 124 is one of the routers of the specified nodes, it is determined that the downstream router 124 belongs to the at least one responding router.

In step 330, if it is determined in the step 320 that the downstream router 124 belongs to the at least one responding router, then it generates a multicast echo reply message including the identifier of the multicast tree 100.

In step 340, the downstream router 124 sends the generated multicast echo reply message to the initiating router (e.g., the router 120 in FIG. 1) of the multicast echo request message.

Furthermore, in some implementations, the method 300 may further include one or more optional steps. For example, in step 350, the downstream router 124 updates the multicast echo request message. In step 360, the updated multicast echo request message is sent to its downstream routers along the datapath of the multicast tree 100.

Herein, although steps 350 and 360 are shown and described after steps 330 and 340, it should be understood by those skill in this art that relations between those steps are not limited thereto. For example, generating and sending the multicast echo reply message and updating and forwarding the multicast echo request message may be proceeded in parallel, or generating and sending the multicast echo reply message may be proceeded after updating and forwarding the multicast echo request message.

On the other hand, if it is determined in the step 320 that the downstream router 124 does not belong to the at least one responding router, the method proceeds to steps 350 and 360 directly to update and forward the received multicast echo request message.

In one implementation, the method 300 further includes (not shown in the figure): determining whether a received multicast echo request message includes trace route indication information that comprises a system address of the initiating router and a time stamp of sending the multicast echo request message. If it is determined that the received multicast echo request message includes the trace route indication information, the downstream router 124 adds the system address of the downstream router 124 and the time stamp of receiving the multicast echo request message into the received multicast echo request message.

That is to say, if the multicast echo request message is used for route tracing, the initiating router and each responding router should include its system address and time stamp of sending/receiving the multicast echo request message into the multicast echo request message in a list and forward it to the next hop (if the next hop is not a receiver). In the case that the next hop is a receiver (i.e., a host), which shows that the multicast echo request message has arrived at the destination router along the datapath of the multicast tree, the multicast echo reply message sent from the last responding router (i.e. the previous hop node of the receiver) to the initiating router will include a complete router node list for multicast route tracing.

Figure 4:
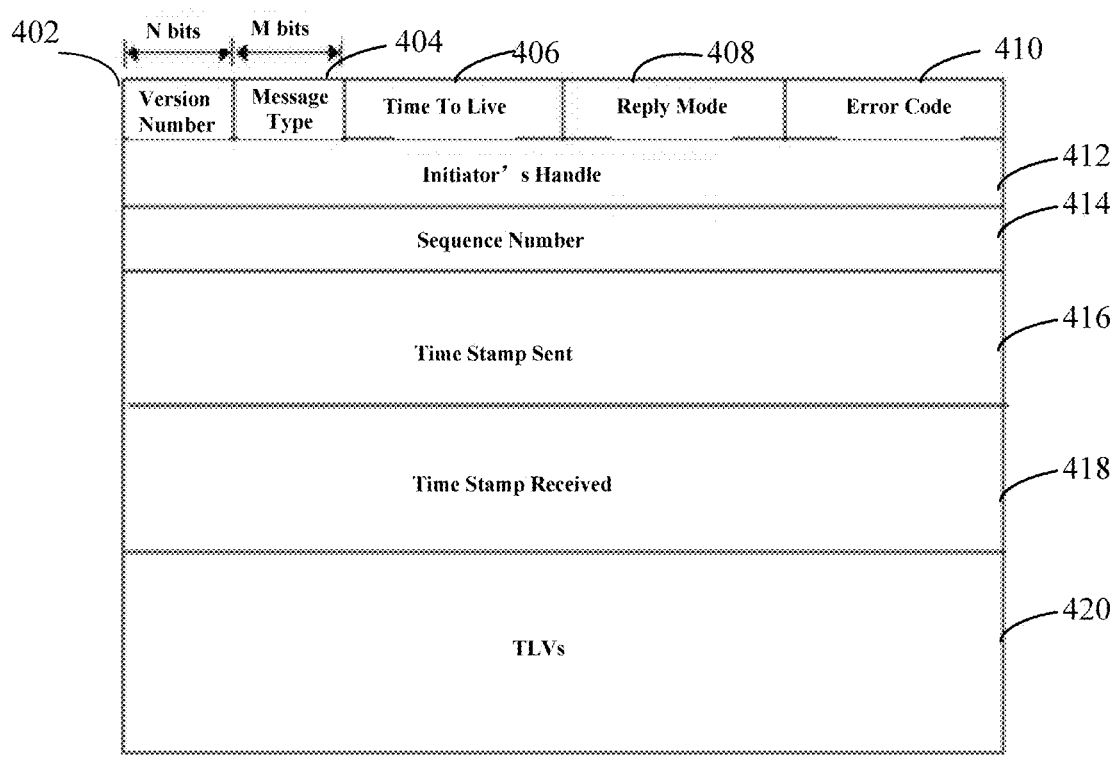
FIG. 4 illustrates a more detailed example for a multicast echo request message and a multicast echo reply message according to some embodiments of this disclosure.

FIG. 4 illustrates a more detailed example of a multicast echo request message (sometimes called a multicast echo request packet in this disclosure) and a multicast echo reply message (sometimes called a multicast echo reply packet in this disclosure) according to some embodiments of this disclosure. In particular, in some embodiments of this disclosure, a new unified message format, the payload of which is shown in FIG. 4, may be defined for the multicast echo request message and the multicast echo reply message.

In one implementation, both the multicast echo request message and the multicast echo reply message are carried in User Datagram Protocol (UDP) packets. The UDP port number may be locally configured on each OAM embedded and enabled router with vendor-proprietary value or publically assigned by standard bodies for global interoperability. Such a UDP port is called the Mcast-OAM port in this disclosure.

In the example of FIG. 4, the message may include the following fields: version number field 402, message type field 404, time to live (TTL) field 406, reply mode field 408, error code field 410, handle of the initiating router field 412, sequence number field 414, time stamp sent field 416, time stamp received field 418, and TLV field 420. Please note that these fields are exemplary but not to limit the scope of this disclosure. Any alternative or additional fields are possible.

The version number field 402 is used to indicate version number of message format used in the multicast echo request message and the multicast echo reply message. In one example, this field may occupy predetermined N bits (as shown in the figure), N being a natural number. In one embodiment, for example, N may be 4, but of course any other suitable numerical value is possible. In one example of this disclosure, the version number is set to 1. However, this disclosure is not limited thereto and the version number may be set to any values other than 1.

The message type field 404 is used to identify the message type of the sent/received message, i.e., the multicast echo request message or the multicast echo reply message. In one example, this field may occupy M bits (as shown in the figure), M being a predetermined natural number. In one embodiment, for example, M may be 4, but of course any other suitable numerical value is possible. In one example of this disclosure, the value of the message type may be as shown in the following Table 1. However, this disclosure is not limited thereto and the value of the message type may be set to any other values that may discriminate the multicast echo request message and the multicast echo reply message.

TABLE 1

| Message Type | |
| --- | --- |
| Value | Meaning |
| 1 | Multicast echo request message |
| 2 | Multicast echo reply message |

The time to live (TTL) field 406 is used to indicate the maximum number of OAM entities that a multicast echo request message is allowed to propagate. This field must be decreased by 1 after each hop of an enabled OAM entity. If the value of this field decreases to zero, the multicast echo request message must be dropped and stopped from forwarding. The TTL value may be used to control the scope of propagation of the multicast echo request message. Usually, the administrator may set any integer from 1 to 255 as the initial value of TTL.

Please note that the IP packet header also contains a TTL filed, which should not be confused with the TTL field of the multicast echo request message defined in this disclosure. Since the administrator may choose a subset of the multicast routers to embed and enable the OAM entities, the hop number between OAM entities may or may not be coincident with that between the routers. For this reason, a TTL field in the multicast echo request message is useful to control the scope of its propagation.

The reply mode field 408 is used to instruct the responding routers how to send back the replied multicast echo reply messages. In one example, this field may occupy 1 octet. In one implementation of this disclosure, only one value is defined for the reply mode. That is to say, reply mode=1 means to reply via a IPv4 UDP packet. Usually, the IPv4 UDP packet based Reply Mode 1 is enough for multicast datapath verification operations. If other reply mode is required for special cases, this value may be extended. Although only one reply mode value is defined in this disclosure, it should be understood by those skilled in this art that the reply mode value is not limited thereto and any other suitable reply mode values fall in the scope of this disclosure.

The error code field 410 is used by the responding routers to return error codes. In one example, the field may occupy 1 octet. In one implementation of this disclosure, error codes as shown in the following Table 2 are defined. It should be understood by those skilled in this art that error codes as shown in the following Table 2 may be extended as required.

TABLE 2

Error Codes

| Value | Meaning |
|---|---|
| 0 | No error |
| 1 | Unsupported Version Number |
| 2 | Unsupported Message Type |
| 3 | Unsupported Reply Mode |
| 4 | Incoming Message with TTL = 0 |
| 5 | Malformed TLV(s) |
| 6 | RPF check error for the specified MDT identifier |
| 7 | TIB state error for the specified MDT identifier |
| 8 | General error |

The handle of the initiating router field 412 is filled by the initiating router of multicast echo request message. It is returned unchanged by the responding router in the multicast echo reply message. The initiating router may use the value of this field to match reply and request messages. In the example as shown in FIG. 4, this field may occupy 4 octets.

The sequence number field 414 is set by the initiating router of the multicast echo request message and returned unchanged by the responder in the multicast echo reply message. The initiating router may use the value of this field to detect missed reply messages. As shown in the example in FIG. 4, the field may occupy 8 octets.

The time stamp sent field 416 is the time-of-day filled according to the initiating router's clock when the multicast echo request message is sent, which may be in Network Time Protocol (NTP) format, for example. In the example as shown in FIG. 4, this field may occupy 8 octets.

The time stamp received field 418 indicates the time-of-day filled according to the responding router's clock when the multicast echo request message is received, which may also be in NTP format. In the example as shown in FIG. 4, this field may occupy 8 octets.

Figure 5:
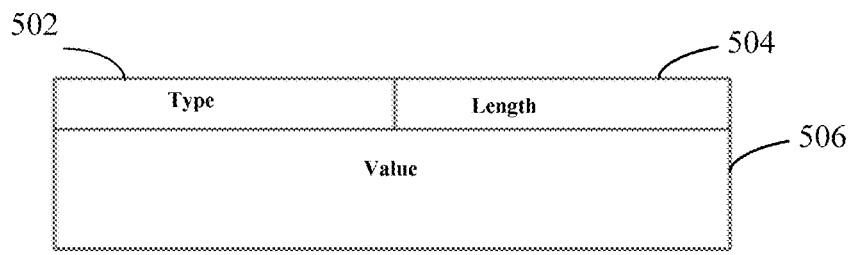
FIG. 5 illustrates a schematic view of Type-Length-Values (TLVs) and sub-TLVs in a multicast echo request message and a multicast echo reply message according to this disclosure.

One example implementation of the TLV field 420 is shown in FIG. 5. In particular, FIG. 5 illustrates a schematic view of TLVs and sub-TLVs in a multicast echo request message and a multicast echo reply message according to this disclosure. The type field 502 of the TLV indicates the type (exemplary definitions of which are shown in Table 3) of the TLV. The length field 504 indicates the length, for example represented by 1 octet, of the "value" field 506. The content of the "value" field 506 depends on its type and it is zero padded to align to a 4-octet boundary. TLVs may be nested within other TLVs, in which case the nested TLVs are called sub-TLVs. Sub-TLVs have independent types and must also be 4-octet aligned.

The top-level TLVs for multicast echo request and multicast echo reply messages are listed in Table 3.

TABLE 3

The top-level TLVs for multicast echo request message and multicast echo reply message

| Type | Meaning |
|---|---|
| 1 | MDT Identifier |
| 2 | Responder |
| 3 | Role |
| 4 | Trace Route |

The value of the MDT Identifier TLV as described in Table 3 is a sub-TLV as defined in the following Table 4.

TABLE 4

MDT Identifier TLV

| Type of Sub-TLV | Length | Value | Meaning |
|---|---|---|---|
| 1 | 8 | a pair of IPv4 addresses represented as (*, G) or (S, G) | MDT Identifier for IPv4 network |

The MDT Identifier TLV is mandatory in the multicast echo request and reply messages. The MDT Identifier for ASM (*, G) or SSM (S, G) is encoded as a pair of 4-octet fields. The value of the first 4-octet field should be all zeros for ASM (*, G), or the unicast IPv4 address of the multicast source for SSM (S, G). The value of the second 4-octet field is the multicast IPv4 address for both ASM (*, G) and SSM (S, G). In the description of this disclosure, an IPv4 address is usually used when the address or the system address is mentioned, but it should be understood by those skilled in this art that this disclosure is not limited thereto and that other existing or future developed address format (IPv6 address, for example) may also be applied in the schemes proposed in this disclosure.

Values for the responder TLV as shown in Table 3 is the sub-TLV defined in the following Table 5. In particular, the responder TLV is mandatory in the multicast echo request message.

TABLE 5

Responder TLV

| Type of Sub-TLV | Length | Value | Meaning |
|---|---|---|---|
| 1 | 0 | Null | All Leaf-only Nodes |
| 2 | 0 | Null | All Nodes |
| 3 | 4 | IPv4 address | A specific node identified by this system address |

The Role TLV in Table 3 is optional in both the multicast echo request and reply messages. If it is present in the multicast echo request message, its value must be 0, indicating that the initiating router requests the responding router to report its Role in the MDT (i.e., Leaf-only, Branch-only, or Leaf-and-Branch node). When the responding router constructs the multicast echo reply message, it shall or shall not include a Role TLV solely based on whether there is a Role TLV (with Value 0) in the incoming multicast echo request message. The reported Role TLV may carry one of the following values listed in Table 6.

TABLE 6

Role TLV

| Value | Meaning |
| --- | --- |
| 0 | Request the responder to report its role in the MDT |
| 1 | Leaf-only node |
| 2 | Brach-only node |
| 3 | Leaf-and-Branch node |

The trace route TLV in Table 3 is optional, which is used to keep the hop-by-hop routes and time stamp information when a multicast echo request packet traverses from the initiating router downstream to the responding router. The trace route TLV may be present in both the multicast echo request and reply messages. Essentially, this TLV indicates whether a multicast echo request message is intended for multicast Ping or multicast trace route. If the multicast echo request message includes the trace route TLV, it indicates that the multicast echo request message is used for route tracing. On the contrary, when the trace route TLV is not included in the multicast echo request message, it indicates that the multicast echo request message is used for multicast Ping.

In one embodiment, the value of the trace route TLV is a sub-TLV as defined in the following Table 7.

TABLE 7

Trace Route TLV

| Type of Sub-TLV | Length | Value |
| --- | --- | --- |
| 1 | multiples of 12 | a list of pairs of IPv4 address and time stamp |

The Value field is a list of 12-octet items, with each item comprising a 4-octect IPv4 address sub-item and a 8-octet Time Stamp sub-item. The IPv4 address sub-item holds the system addresses of the traversed routers (including the initiating router and the responding router(s)), and the time stamp sub-item holds the time-of-day (in NTP format, for example) according to the local clocks of the traversed routers.

If the multicast trace route function is invoked on the initiating router, a trace route TLV must be included in the multicast echo request message generated by the initiating router. On the initiating router, the value of the trace route TLV must contain only one pair of IPv4 address and time stamp. The IPv4 address is the system address of the initiating router, and the time stamp is the time-of-day (in NTP format, for example) according to the local clock of the initiating router (same as the time stamp sent value in FIG. 4). For each traversed router with an OAM entity embedded and enabled, upon receipt of the multicast echo request message with a trace route TLV, it must update the message by appending an additional pair of IPv4 address and time stamp to the tail of the existing trace route TLV to indicate its system address and the time-of-day, then replicate and forward the updated multicast echo request message just like a normal multicast packet.

An exemplary operation process for multicast Ping and multicast trace route will be described below in conjunction with FIG. 1-FIG. 3 and the multicast echo request message and the multicast echo reply message in FIG. 4.

The operations of the multicast Ping and multicast trace route are similar. The initiating router (e.g., the router 120 in FIG. 1) sends the multicast echo request message and waits for the multicast echo reply message returned from the responding routers (e.g., the routers 120, 122, 124, 126, 128, 130 and 132 in FIG. 1, depending on the configuration of the responding TLV in the multicast echo request message).

The multicast echo request message travels downstream along the datapath of the MDT, and is updated and forwarded at each router with an OAM entity embedded and enabled. Note that if the router hosting the OAM entity is a branch router or leaf-and-branch router, the updated multicast echo request packets must be replicated before being forwarded to each of its downstream nodes.

Provided that the TTL value is big enough, the multicast echo request message is able to reach all downstream routers (thus all OAM entities) in the MDT. Each traversed router must check if it is among the specified responding routers. If not, the multicast echo request message is simply updated and forwarded to all downstream routers (or stop forwarding when TTL=0 or the leaf node is reached); otherwise, a multicast echo reply packet must first be returned before updating and forwarding the multicast echo request packet.

The multicast echo request and reply messages are in different formats for multicast Ping and multicast trace route. FIGS. 6A and 6B illustrate respectively an exemplary schematic view of a multicast echo request message and a multicast echo reply message used for multicast Ping.

As shown in FIG. 6A, the multicast echo request message for multicast Ping includes a MDT identifier TLV field 602, a responder TLV field 604 and a role TLV field 606 (with a value of 0, for example). As shown in FIG. 6B, the multicast echo reply message for multicast Ping includes a MDT identifier TLV field 602 and a role TLV field 606 (with a value of 1, 2, or 3, for example). In some embodiments, in the multicast echo request message, the MDT identifier TLV field 602 and the responder TLV field 604 are mandatory, and other fields are optional. In some embodiments, in the multicast echo reply message, the MDT identifier TLV field 602 is mandatory, and other fields are optional.

FIGS. 7A and 7B illustrate respectively an exemplary schematic view of a multicast echo request message and a multicast echo reply message used for multicast route tracing.

As shown in FIG. 7A, the multicast echo request message for multicast route tracing includes a MDT identifier TLV field 702, a responder TLV field 704, a role TLV field 706 (with a value of 0, for example), and a trace route TLV field 708. As shown in FIG. 7B, the multicast echo reply message for multicast route tracing includes a MDT identifier TLV field 702, a role TLV field 706 (with a value of 1, 2, or 3, for example), and a trace route TLV field 708. In some embodiments, in the multicast echo request message, the MDT identifier TLV field 702, the responder TLV field 704 and the trace route TLV field 708 are mandatory, and other fields are optional. In some embodiments, in the multicast echo reply message, the MDT identifier TLV field 702 and trace route TLV field 708 are mandatory, and other fields are optional.

It is supposed that the MDT under test is ASM (*, G) or SSM (S, G), where G is the IPv4 multicast address, S is the unicast IPv4 address of the multicast source. It should be noted that for an SSM MDT identified by (S, G), G must be in the range of 232/8; while for an ASM MDT identified by (*, G), G must not be in the range of 232/8.

For the multicast echo request packet, the destination IPv4 address is set to the multicast IPv4 address of the MDT (for both ASM and SSM). The source IPv4 address of the multicast echo request packet is chosen based on whether the MDT is ASM-based or SSM-based. If the MDT is SSM-based, i.e. the MDT is identified by (S, G), the source IPv4 address of the multicast echo request packet is set to S. If the MDT is ASM-based, i.e. the MDT is identified by (*, G), the source IPv4 address of the multicast echo request packet may be set to any routable IPv4 unicast address.

In one example of this disclosure, the source IPv4 address of the multicast echo request packet is set to the system IPv4 address of the router that initiates the multicast echo request packet. The destination and source UDP port numbers are both set to the Mcast-OAM port. For the corresponding multicast echo reply packet, the destination IPv4 address is set to the source IPv4 address (unicast address) of the incoming multicast echo request packet, and the source IPv4 address is set to the system address of the responding router. The destination and source UDP port numbers are both set to the Mcast-OAM port.

The multicast echo request packet travels downstream along the MDT datapath. Provided the TTL of is big enough, eventually each downstream OAM entity in the MDT will receive one and only one incoming multicast echo request packet.

A specific operation example of the initiating router is described below in conjunction with FIG. 1-FIG. 4.

At first, the initiating router constructs the multicast echo request packet to be sent. In one implementation, in the constructed multicast echo request packet, Version Number=1, Message Type=1, Reply Mode=1, Error Code=0, and the TTL value comes from the input of the administrator. Initiator's Handle is used to match reply and request messages. It may be set in various ways. For example, it may be set to a new random number when a new group of consecutive multicast echo request messages are sent. Sequence number is used to detect missed reply messages, and it may also be set in various ways. For example, it may be set to 1, 2, 3 . . . for sending each consecutive message in a group of multicast echo request messages with the same Initiator's Handle value. The Time Stamp Sent is set to the time-of-day of sending the multicast echo request message (in NTP format, for example). The Time Stamp Received may be set to 0.

The MDT Identifier TLV is mandatory in the multicast echo request message for both multicast Ping and trace route. Each responding router must check its RPF and Tree Information Base (TIB) states against this MDT Identifier.

The responder TLV is mandatory for both multicast Ping and trace route. Depending on the administrator's input, the value of the responder TLV may be set to one of Type 1 sub-TLV (All Leaf-only Nodes), Type 2 sub-TLV (All Nodes), or Type 3 sub-TLV (A specific router identifier by the system address).

The trace route TLV is mandatory for the multicast trace route tool, but must not be present in the multicast Ping tool. When the multicast trace route tool is in process, the initiating router must include a trace route TLV in the multicast echo request message. The trace route TLV must only include a pair of IPv4 address and time stamp, where the IPv4 address is the system address of the initiating router and the time stamp is the time-of-day for sending the multicast echo request message (same value as the time stamp sent field in FIG. 4).

The role TLV is optional for both the multicast Ping and trace route. Depending on the administrator's input, the multicast echo request message may or may not include the role TLV.

The constructed multicast echo request message is encapsulated in the IPv4 UDP packet. However, it should be understood by those skilled in this art that this disclosure is not limited thereto and other protocol packets may be used to carry the constructed multicast echo request message (and/or multicast echo reply message).

Next, the initiating router shall send the constructed multicast echo request packet over the datapath of the MDT under test. If the initiating router branches to multiple downstream routers, the constructed multicast echo request packet shall be replicated and forwarded to each downstream router like normal multicast packets.

For the case that all leaf nodes or all nodes shall respond, all OAM entities on the leaf nodes (including Leaf-only and Leaf-and-Branch Nodes), or all OAM entities along the MDT shall reply with a multicast echo reply message. For the case that only a specific router shall respond, only a single OAM entity on the specified router shall reply with a multicast echo reply message, and all other OAM entities just update and forward the multicast echo request message without replying it.

The scope of the test may be controlled by the TTL value. If the complete MDT is to be tested, the initial TTL value may be set to 255 (or any other number that is considered big enough). If only a part of the MDT is to be tested, the TTL value may be set to a relatively small value such as 1, 2, 3 . . . . For example, the multicast echo request message with TTL=1 just test all the routers with neighboring (i.e., only one hop away) OAM entities.

If a router (hereinafter referred as receiving router) with an embedded and enabled OAM entity receives from the upstream node a multicast packet with the destination UDP port equal to the configured Mcast-OAM port, the receiving router will treat it as a multicast echo request packet. The receiving router will first verify that the version number, the message type and the reply mode are all correct and the TTL value is not zero. In case that there is any error, the receiving router must return a multicast echo reply message with corresponding Error Code and stop forwarding the multicast echo request message.

If there is no error in the incoming message format, the router shall analyze the TLV fields. Type 1 TLV (MDT identifier TLV) and Type 2 TLV (responder TLV) are mandatory, and Type 3 TLV (role TLV) and Type 4 TLV (trace route TLV) are optional. If there is any TLV (or sub-TLV) format error in the incoming multicast echo request message, the router must return a multicast echo reply message with Error Code 5 (Malformed TLV) and stop forwarding the multicast echo request message.

If there is no error for both message format and TLV format, the router shall verify the states of RPF and TIB against the MDT Identifier carried in the multicast echo request message. If there is any error in the states of RPF or TIB, the receiving router must return a multicast echo reply packet with Error Code 6 (RPF check error for the specified MDT identifier) or Error Code 7 (TIB state error for the specified MDT), and stop forwarding the multicast echo request message.

After verification of any possible errors, the receiving router may perform the process 200 shown in FIG. 2 to process the incoming multicast echo request message. That is to say, if the receiving router belongs to the responding router(s), the received multicast echo request message is responded with a multicast echo reply message. No matter whether the receiving router belongs to responding router(s), the receiving router will update the multicast echo request message and forward the updated multicast echo request message.

In particular, the procedure of updating the multicast echo request message may be performed as below. The receiving router decreases the TTL value in the received multicast echo request message by 1. If the message contains a trace route TLV, the receiving router appends its system address and the time-of-day (in NTP format, for example) of receiving the message to the tail of the trace route TLV. In this way, the received multicast echo request message is changed to the updated multicast echo request message.

The procedure of forwarding the updated multicast echo request message may be performed as below. If the TTL value of the updated multicast echo request message is zero, then it drops the message and stops forwarding. Otherwise, the receiving router replicates and forwards the updated multicast echo request message like a normal multicast packet downstream along the MDT. Please note that the forwarding process will stop in either of the two cases: (a) the TTL value decreases to 0; and (b) the multicast echo request message reaches a Leaf-only node router.

One specific example of the responding router will be described in combination with FIG. 1-FIG. 4. At first, the responding router constructs the multicast echo reply message to be sent. In one implementation, in the constructed multicast echo reply message, version number=1, and message type=2. TTL and reply mode fields are not used in the multicast echo reply message, so both are set to 0. Initiator's handle, sequence number and time stamp sent are all copied from the incoming multicast echo request message. The time stamp received field is filled with the time-of-day (in NTP format, for example) of receiving the incoming multicast echo request message is received. Whether to include a trace route TLV and a Role TLV in the multicast echo reply message depends on whether the received multicast echo request message includes them.

If the received multicast echo request message does not include a trace route TLV (i.e. the multicast Ping case), the responding router shall not include a trace route TLV in the multicast echo reply message. In contrast, if the received multicast echo request message includes a trace route TLV (i.e. the multicast trace route case), the responding router shall include a trace route TLV in the multicast echo reply message. The trace route TLV in the multicast echo reply message is constructed by appending the responding router's system address and the time-of-day of receiving the incoming multicast echo request message (in NTP format, for example) to the tail of the existing trace route TLVs of the received multicast echo request message.

If the received multicast echo request message does not include a role TLV, the responding router shall not include a role TLV in the multicast echo reply message. Otherwise, the router shall include a role TLV in the multicast echo reply message. The role TLV indicates the role of the responding router in the MDT, for example, whether it is a leaf-only node, a branch-only node, or a leaf-and-branch node.

Next the responding router returns the constructed multicast echo reply message over a UDP IPv4 packet.

In some embodiments, the multicast datapath verification schemes proposed by the present disclosure may be implemented with Command Line Interface (CLI) commands. In one embodiment in which the CLI interface of a router is embedded and enabled in an OAM entity, and the router has also joined an MDT identified by (*, G) or (S,G), the administrator may invoke the multicast Ping and multicast trace route functions with the following commands, for example:

mcast-ping s, g [responder all-leaves|all-nodes|ip-address] [[no] role] [hop hop-count] [timeout interval] [num-requests number]//for multicast Ping (Mcast-ping), or, mcast-traceroute s, g [responder all-leaves|all-nodes|ip-address] [[no] role] [hop hop-count] [timeout interval] [num-requests number]//for multicast trace route (Mcast-traceroute), where "s, g" are mandatory CLI parameters, which specifies the unicast IPv4 address of the multicast source and the multicast IPv4 address of the ASM host group or SSM channel of the MDT. If g is within the range of 232/8 (SSM case), s should be a unicast IPv4 address; otherwise (ASM case), s should be "*", i.e., any multicast source.

Furthermore, "responder all-leaves|all-nodes|ip-address" is an optional parameter, which specifies the routers to respond to the request message. For Mcast-Ping, the default value is all-leaves; and for Mcast-traceroute, no default value is given.

The "[no] role" is an optional parameter, which specifies whether the responding router should report its role in the MDT. The default value is "role", i.e. the responders shall report the role.

The "hop hop-count" is an optional parameter, which specifies the initial TTL value of the request message. The default value is 255.

The "timeout interval" is an optional parameter, which specifies the time interval during which the initiating router collects the reply messages. All reply messages past the time interval are discarded. The default value is determined by the implementer.

The "num-requests number" is an optional parameter, which specifies the number of request messages the initiating router sends in a sequence. The default value is 3 for Mcast-ping, and 1 for Mcast-traceroute.

With FIG. 1 as an example, it is supposed that the identifier of the MDT 100 is (*, 224.1.1.1); the router 120 is an RP router (initiating router) with an IP address 10.1.1.1; the router 122 is a specified router with an IP address 10.1.2.1; the router 124 is a branch node with an IP address 10.1.1.1; the router 124 is a leaf node with an IP address 10.1.3.1; the router 128 is a leaf node with an IP address 10.1.1.4; the router 130 is a leaf-and-branch node with an IP address 10.1.1.3; and the router 132 is a leaf node with an IP address 10.1.4.1.

FIG. 8A illustrates a schematic view of a CLI command interface used for multicast Ping according to an embodiment of this disclosure. As shown in FIG. 8A which uses a CLI command "mcast-ping *, 224.1.1.1 responder all-leaves" as an example, this command sends 3 consecutive multicast echo request packets along the datapath of the MDT identified by (*, 224.1.1.1), and all the downstream leaf routers with embedded and enabled OAM entities, including leaf-only and leaf-and-branch routers, must respond to the Mcast-Ping requests.

FIG. 8B illustrates a schematic view of a CLI command interface used for multicast route tracing according to an embodiment of this disclosure. As shown in FIG. 8B which uses a CLI command "mcast-traceroute *, 224.1.1.1 responder 10.1.4.1" as an example, this command sends 1 multicast echo request packet along the datapath of the MDT identified by (*, 224.1.1.1), and the router with system address 10.1.4.1 (i.e. the router 132) must respond to the Mcast-traceroute request. Please note that the router with system address 10.1.4.1 should have already joined into the datapath of the specified MDT, and it must have an OAM entity embedded and enabled; otherwise, no reply message will be returned.

Figure 9:
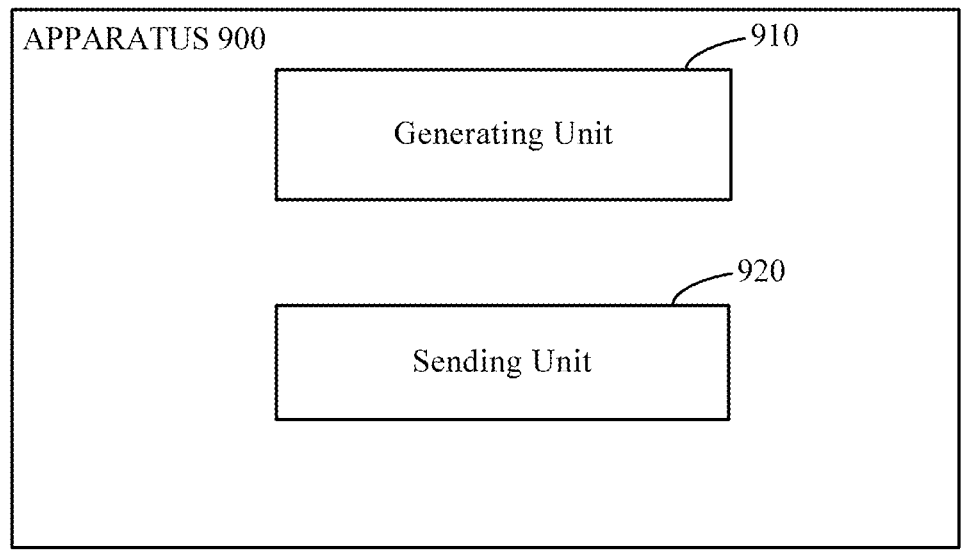
FIG. 9 illustrates a block diagram of an apparatus for verifying a multicast datapath according to some embodiments of this disclosure.

FIG. 9 illustrates a block diagram of an apparatus 900 for verifying a multicast datapath according to some embodiments of this disclosure. The apparatus 900 may be implemented in or by an initiating router (e.g., the router 120 in FIG. 1).

As shown in FIG. 9, the apparatus 900 includes a generating unit 910 configured to generate a multicast echo request message that at least comprises: an identifier of a multicast tree and an indication of at least one responding router that should respond to the multicast echo request message. The apparatus 900 further includes a sending unit 920 configured to send the multicast echo request message along the datapath of the multicast tree to a downstream router of the initiating router.

In some implementations, the identifier of the multicast tree comprises a pair of source address and destination address, the destination address comprising a multicast address of the multicast tree and the source address comprising a unicast address of a multicast source in a SSM model or a system address of any source in an ASM model.

In some implementations, the indication of at least one responding router that should respond to the multicast echo request message comprises an indication of at least one of all routers that are leave-only nodes of the multicast tree, routers of all nodes of the multicast tree or routers of specified nodes.

In some implementations, the generating unit 910 is further configured to generate the multicast echo request message to further comprise trace route indication information that comprises a system address of the initiating router and a time stamp of sending the multicast echo request message.

In some implementations, the generating unit 910 is further configured to generate the multicast echo request message to further comprise a message type field set to be a first value.

The apparatus 900 further includes a receiving unit (not shown in the figure) configured to receive a multicast echo reply message, the multicast echo reply message comprising a message type field set to be a second value different from the first value.

In some implementations, the multicast echo request message further comprises at least one of version number, time to live, reply mode, error code, handle of the initiating router, sequence number, time stamp sent and time stamp received.

Figure 10:
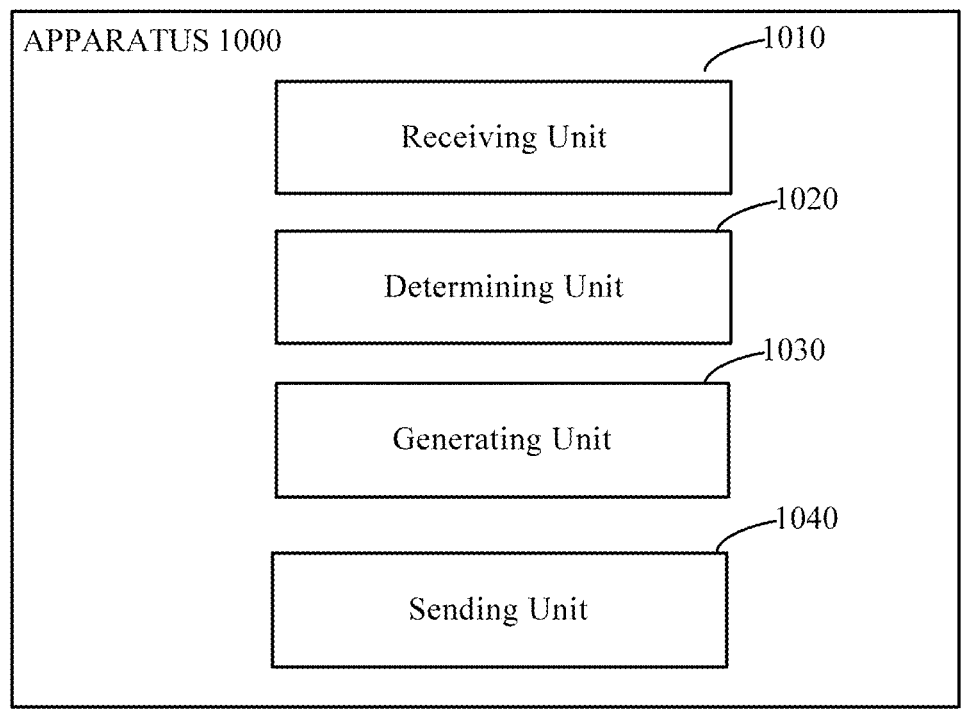
FIG. 10 illustrates a block diagram of an apparatus for verifying a multicast datapath according to some embodiments of this disclosure.

FIG. 10 illustrates a block diagram of an apparatus 1000 for verifying a multicast datapath according to some embodiments of this disclosure. The apparatus 1000 may be implemented in or by a router downstream the initiating router, which may be a responding router.

As shown in FIG. 10, the apparatus 1000 may include a receiving unit 1010 configured to receive a multicast echo request message from an upstream router along the datapath of a multicast tree, the multicast echo request message comprising an identifier of the multicast tree and an indication of at least one responding router that should respond to the multicast echo request message. The apparatus 1000 may further include a determining unit 1020 configured to determine whether the router belongs to the at least one responding router indicated in the multicast echo request message based on the indication of the at least one responding router. The apparatus 1000 may further include a generating unit 1030 configured to generate a multicast echo reply message comprising the identifier of the multicast tree, in response to determining that the router belongs to the at least one responding router indicated in the multicast echo request message. The apparatus 1000 may further include a sending unit 1040 configured to send the multicast echo reply message to an initiating router of the multicast echo request message.

In some implementations, the identifier of the multicast tree comprises a pair of source address and destination address, the destination address comprising a multicast address of the multicast tree and the source address comprising a unicast address of a multicast source in a SSM model or a system address of any source in an ASM model.

In some implementation, the determining unit 1020 is configured to perform any one of:

determining that the router belongs to the at least one responding router in response to determining that the indication of the at least one responding router comprises an indication of all routers of leave-only nodes of the multicast tree and the router is a leaf node of the multicast tree;

determining that the router belongs to the at least one responding router in response to determining that the indication of the at least one responding router comprises an indication of routers of all nodes; and determining that the router belongs to the at least one responding router in response to determining that the indication of the at least one responding router comprises an indication of routers of specified nodes and the router belongs to the routers of the specified nodes.

In some implementations, the apparatus 1000 may further include an updating unit (not shown in the figure) configured to update the multicast echo request message after receiving the multicast echo request message; and a forwarding unit (not shown in the figure) configured to forward the updated multicast echo request message to a downstream router of the router along the datapath of the multicast tree.

In some implementations, the determining unit 1020 is further configured to determine whether the multicast echo request message comprises trace route indication information that comprises a system address of the initiating router and a time stamp of sending the multicast echo request message. In this case, the determining unit 1020 may further include an appending unit (not shown in the figure) configured to append the system address of the router and a receiving time stamp to the multicast echo request message in response to determining that the multicast echo request message comprises the trace route indication information.

In some implementations, the multicast echo request message comprises a message type field set to a first value; and the generating unit 1030 is further configured to generate the multicast echo reply message to further comprise a message type field set to a second value different from the first value.

In some implementations, the determining unit 1020 is further configured to determine whether a version number, a message type and a reply mode in the multicast echo request message are correct, and to determine whether a time to live in the multicast echo request message is expired. In this case, the generating unit 1030 is further configured to generate the multicast echo reply message to include an error code without forwarding the multicast echo request message, in response to determining that any one of the version number, the message type and the reply mode in the multicast echo request message is not correct or determining that the time to live in the multicast echo request message is expired.

It should be understood that each of the apparatuses 900 and 1000 as shown in FIG. 9 and FIG. 10 may be implemented partly or entirely by software modules, hardware modules, firmware modules or any combination thereof and the scope of this disclosure is not limited thereto. For example, in a hardware based implementation, an Integrated Circuit (IC), an Application Specific Integrated Circuit (ASIC), a System on Chip (SOC), a Field-Programmable Gate Array (FPGA), etc. may be used to implement one or more units described above.

Figure 11:
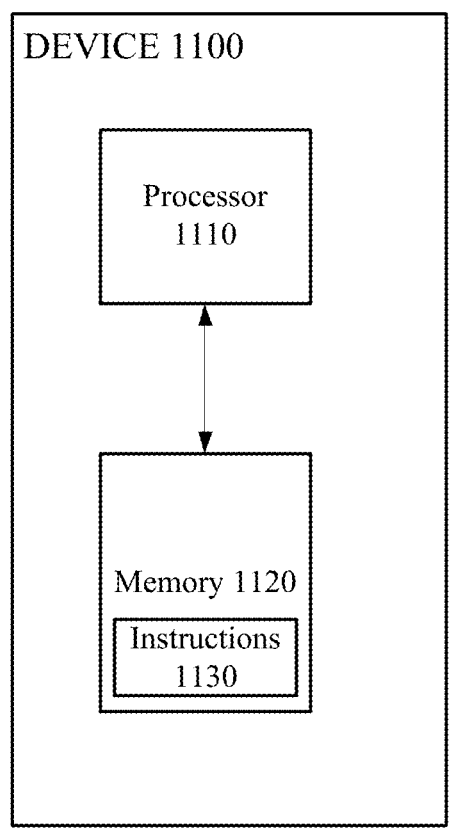
FIG. 11 illustrates a block diagram of a device suitable for implementing embodiments of this disclosure.

FIG. 11 illustrates a block diagram of a device 1100 suitable for implementing embodiments of this disclosure. The device 1100 may be used to implement an initiating router e.g., the router 120 in FIG. 1, or a router on the downstream of the initiating router 120, such as a responding router.

As shown in FIG. 11, the device 1100 may include a processor 1110 and a memory 1120 coupled to the processor 1110. The memory 1120 stores instructions 1130 that may be executed by the processor 1110. The memory 1120 may be of any suitable type that is suitable for local technical environment and may be implemented with any suitable data storage technologies, including but not limited to semiconductor based storage devices, magnetic storage devices and systems, optical storage devices and systems. Although only one memory unit is shown in FIG. 11, a plurality of physically different memory units may be included in the device 1100.

The processor 1110 may be of any suitable type that is suitable for local technical environment and may include but are not limited to one or more of general computers, specific computers, micro-processors, Digital Signal Processors (DSPs) and processor based multi-core processor architectures. The device 1100 may also include a plurality of processors 1110. The processor 1110 is configured to perform the method 200 or 300 as shown in FIG. 2 or FIG. 3.

This disclosure proposes two new multicast OAM tools for multicast datapath verification. To support the new tools, this disclosure defines the new multicast echo request message and multicast echo reply message, and describes the operations of the new multicast OAM tools.

This disclosure proposes a method to verify the datapath of an MDT by replicating and forwarding the OAM packet at each router according to the Multicast Forwarding Information Base (MFIB) state. At the router where an OAM entity is embedded and enabled, the incoming OAM packet is checked against the RPF and TIB states with regard to the identifier of the multicast tree carried on the OAM packet. By this means, the consistency of datapath and control plane is verified. In short, the method proposed in this disclosure is able to verify the multicast datapath as well as its consistency against the control plane.

This disclosure proposes to embed an OAM entity on the multicast router to initiate and respond to multicast OAM messages. The administrator may choose to embed the OAM entities on all or a subset of the multicast routers. Those routers with the OAM entities embedded and enabled are "visible" to the OAM tools proposed in this disclosure, and those other routers without embedded OAM entities or with the embedded OAM entities disabled are "invisible" to the OAM tools proposed in this disclosure. It should be noted that in this disclosure, to be precise, when referring to a router sending and receiving multicast OAM messages, actually the OAM entity of the router is referred.

To be able to intercept and decode the multicast echo request packet, a multicast router in the multicast tree needs to embed an OAM entity. Depending on the role of the router in the multicast tree (e.g. Leaf-only, Branch-only, or Leaf-and-Branch) and the reply instructions carried on the multicast echo request packet, the router may or may not need to respond to the incoming multicast echo request packet. By defining an appropriate message format for the multicast echo request packet, various aspects of the multicast datapath may be detected, such as discovering the active Leave Nodes, verifying the connectivity or tracing the hop-by-hop route between the root node and any leaf node, etc.

Please note that strictly speaking, the leaf nodes of a multicast tree refer to the multicast receivers (hosts) rather than routers. However, since this disclosure is intended for routers, not hosts, so when referring to the Leave Node of a multicast tree in this disclosure, it refers to the last hop router between the multicast source and a receiver, which is connected to the local network of the multicast receiver, functioning as Internet Group Management Protocol (IGMP) querier on the local network of receiver as well as Protocol Independent Multicast-Sparse Mode (PIM-SM) protocol entity to other multicast routers.

If the multicast echo request packet is initiated at the root node, such as the Rendezvous Point (RP) of a shared tree, or the Designated Router (DR) of a source tree (Note: for a shared tree, DR is also a good location to initiate the multicast echo request packet), the mechanism proposed in this disclosure may be used to verify the complete datapath of the multicast tree. However, if the multicast echo request packet is initiated at a router downstream the Root Node, only a sub-tree of the multicast tree may be verified.

Please note that strictly speaking, the root of a source tree refers to the multicast source (a host), not the DR router. However, since this disclosure is intended for routers, not hosts, so when referring to the root of a source tree in this disclosure, it usually refers to the DR router, which is directly connected to the local network of the multicast source and runs the PIM-SM protocol on behalf of the multicast source.

Please also note that to verify the complete datapath of a multicast tree, the location of the multicast tree Root Node (RP for a shared tree or DR for a source tree) must be known. This disclosure assumes that the administrator is able to learn the location (or the system IP address) of the multicast tree Root Node by some other means outside of this disclosure.

The multicast datapath verification solutions proposed in this disclosure may be initiated in two modes: the multicast Ping mode and the multicast trace route mode. The multicast Ping mode verifies the multicast datapath connectivity between the initiating and responding routers. In addition to connectivity verification, optionally other information may also be detected, such as single trip time along the multicast tree, role of the responding router in the multicast tree (e.g. Leaf-only, Branch-only, or Leaf-and-Branch). The multicast trace route mode discovers the hop-by-hop route between the initiating and responding routers. Both the Ping and trace route mode may verify whether the datapath is consistent with the control plane.

In one or more exemplary designs, the functions described by this application may be implemented in hardware, software, firmware, or any combination thereof. If implemented in software, the functions may be stored on or transmitted over as one or more instructions or code on a computer-readable medium. Computer-readable media includes both a computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be configured to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

The various illustrative logical blocks, modules, and circuits described in connection with the aspects disclosed herein may be implemented within or performed by a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of ordinal skill in this art would further appreciate that any of the various illustrative logical blocks, modules, processors, means, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the examples and designs shown herein but is to be accorded the widest scope consistent with the principles and novel features disclosed herein.

I claim:

1. A method for verifying a multicast datapath, comprising, at an initiating router:
   generating a multicast echo request message that at least comprises,
   an identifier of a multicast tree including a pair of source address and destination address, and
   an indication of at least one specified responding router along the multicast datapath that should respond to the multicast echo request message before the multicast echo request message reaches a destination router of the destination address; and
   sending the multicast echo request message to a router downstream of the initiating router along the multicast datapath of the multicast tree between the source address and destination address.

2. The method of claim 1, wherein the identifier of the multicast tree further includes the destination address comprising a multicast address of the multicast tree, and the source address comprising a unicast address of a multicast source in a Source-Specific Multicast (SSM) model or a system address of any source in an Any Source Multicast (ASM) model.

3. The method of claim 1, wherein the indication of at least one specified responding router that should respond to the multicast echo request message comprises an indication of at least one of all routers that are leave-only nodes of the multicast tree, routers of all nodes of the multicast tree or routers of specified nodes.

4. The method of claim 1, further comprising:
   generating the multicast echo request message to further comprise trace route indication information that comprises a system address of the initiating router and a time stamp of sending the multicast echo request message.

5. The method of claim 1, further comprising:
   generating the multicast echo request message to further comprise a message type field set to a first value; and
   receiving a multicast echo reply message comprising the message type field set to a second value different from the first value.

6. The method of claim 1, wherein the multicast echo request message further comprises at least one, of version number, time to live, reply mode, error code, handle of the initiating router, sequence number, time stamp sent, or time stamp received.

7. A router device for verifying a multicast datapath, comprising:
   a processor and a memory comprising instructions executable by the processor, the processor being configured to make the router device perform the method of claim 1.

8. A method for verifying a multicast datapath, comprising, at a router:
   receiving a multicast echo request message from an upstream router along the datapath of a multicast tree, the multicast echo request message comprising an identifier of the multicast tree and an indication of at least one specified responding router that should respond to the multicast echo request message before the multicast echo request message reaches a destination router of a destination address;
   determining whether the router belongs to the at least one specified responding router indicated in the multicast echo request message based on the indication of the at least one specified responding router;
   generating a multicast echo reply message comprising the identifier of the multicast tree, in response to determining that the router belongs to the at least one specified responding router indicated in the multicast echo request message; and
   sending the multicast echo reply message to an initiating router of the multicast echo request message; and
   forwarding the multicast echo request message to a downstream router of the router along the datapath of the multicast tree.

9. The method of claim 8, wherein the identifier of the multicast tree comprises a pair of source address and destination address, the destination address comprising a multicast address of the multicast tree, and the source address comprising a unicast address of a multicast source in a Source-Specific Multicast (SSM) model or a system address of any source in an Any Source Multicast (ASM) model.

10. The method of claim 8, wherein the determining whether the router belongs to the at least one specified responding router indicated in the multicast echo request message comprises one of:
- determining that the router belongs to the at least one specified responding router in response to determining that the indication of the at least one specified responding router comprises an indication of all routers of leave-only nodes of the multicast tree and the router is a leaf node of the multicast tree;
- determining that the router belongs to the at least one specified responding router in response to determining that the indication of the at least one specified responding router comprises an indication
- of routers of all nodes; or
- determining that the router belongs to the at least one specified responding router in response to determining that the indication of the at least one specified responding router comprises an indication of routers of specified nodes and the router belongs to the routers of the specified nodes.

11. The method of claim 8, wherein the forwarding the multicast echo request message to a downstream router of the router along the datapath of the multicast tree includes
- updating the multicast echo request message after receiving the multicast echo request message; and
- forwarding the updated multicast echo request message to a downstream router of the router along the datapath of the multicast tree.

12. The method of claim 8, further comprising:
- determining whether the multicast echo request message comprises trace route indication information that comprises a system address of the initiating router and a time stamp of sending the multicast echo request message; and
- appending the system address of the initiating router and a receiving time stamp to the multicast echo request message, in response to determining that the multicast echo request message comprises the trace route indication information.

13. The method of claim 8, wherein the multicast echo request message further comprises a message type field set to a first value, and the method further comprises:
- constructing the multicast echo reply message to further comprise a message type field set to a second value different from the first value.

14. The method of claim 13, further comprising:
- determining whether a version number, a message type and a reply mode in the multicast echo request message are correct;
- determining whether a time to live in the multicast echo request message is expired; and
- generating the multicast echo reply message to include an error code without forwarding the multicast echo request message, in response to determining that any one of the version number, the message type and the reply mode in the multicast echo request message is not correct or determining that the time to live in the multicast echo request message is expired.

15. A router device for verifying a multicast datapath, comprising:
- a processor and a memory comprising instructions executable by the processor, the processor being configured to make the router device perform the method of claim 8.

* * * * *